United States Patent
Story

(10) Patent No.: US 9,902,219 B2
(45) Date of Patent: Feb. 27, 2018

(54) TWO-PIECE MOUNT/DEMOUNT HEAD FOR A WHEEL SERVICING MACHINE

(75) Inventor: John Story, Murfreesboro, TN (US)

(73) Assignee: Hennessy Industries, Inc., LaVergne, TN (US)

(*) Notice: Subject to any disclaimer, the term of this patent is extended or adjusted under 35 U.S.C. 154(b) by 502 days.

(21) Appl. No.: 13/536,341

(22) Filed: Jun. 28, 2012

(65) Prior Publication Data
US 2014/0000813 A1      Jan. 2, 2014

(51) Int. Cl.
*B60C 25/132*     (2006.01)
*B60C 25/135*     (2006.01)
*B60C 25/05*      (2006.01)

(52) U.S. Cl.
CPC .......... *B60C 25/0593* (2013.01); *B60C 25/05* (2013.01); *B60C 25/0563* (2013.01); *B60C 25/132* (2013.01); *B60C 25/0536* (2013.01); *B60C 25/0545* (2013.01)

(58) Field of Classification Search
CPC ... B60C 25/05; B60C 25/0593; B60C 25/132; B60C 25/0563
See application file for complete search history.

(56) References Cited

U.S. PATENT DOCUMENTS

| | | | | |
|---|---|---|---|---|
| 5,472,034 A | * | 12/1995 | Corghi | B60C 25/132 |
| | | | | 157/1.24 |
| 6,056,034 A | * | 5/2000 | Matnick | 157/1.24 |
| 6,453,971 B2 | * | 9/2002 | Vignoli | 157/1.22 |

FOREIGN PATENT DOCUMENTS

| | | |
|---|---|---|
| DE | 4007006 A1 | 9/1990 |
| EP | 1167088 A2 | 1/2002 |
| EP | 1717064 A1 * | 11/2006 ........... B60C 25/138 |
| JP | 07-001930 A | 1/1995 |
| WO | 97/06969 A1 | 2/1997 |

OTHER PUBLICATIONS

International Search Report in corresponding International Application No. PCT/US2012/044819 dated Jan. 30, 2013, 3 pp.

* cited by examiner

*Primary Examiner* — Bryan R Muller
(74) *Attorney, Agent, or Firm* — Ryan D. Levy; Patterson Intellectual Property Law, P.C.

(57) ABSTRACT

A tire changing tool head, or a mount/demount head for a tire changing machine, includes a head body and a tongue member. The tongue member is pivotally attached to the head body at a pivoting joint. The tongue member includes a tongue shoulder and a tongue blade for engaging a tire bead during tire installation. The tongue member includes a non-metal material, such as a polymer, for preventing wheel rim damage in some embodiments. The head body includes a bead lifter tool protruding therefrom. In some embodiments, the head body and bead lifter tool include a metal material.

10 Claims, 7 Drawing Sheets

TWO-PIECE MOUNT/DEMOUNT HEAD FOR A WHEEL SERVICING MACHINE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND

The present invention relates generally to tire changing tools for engaging a tire and/or a wheel rim during a tire changing or tire servicing operation. More particularly, the present invention pertains to a mount/demount tool head for attachment to a shaft on a tire changing machine.

Tires generally include a resilient tire bead that must be forced over the outer perimeter of a wheel rim to remove the tire from the wheel rim or to install the tire onto the wheel rim. In many applications, the tire bead and the tire sidewall may be relatively stiff or rigid, creating difficulties in manually forcing the bead over the wheel rim. To overcome this difficulty, conventional tire changing tools are known in the art for installing a tire on a wheel rim or removing a tire from a wheel rim. Such conventional tools may include a pry bar, or a tire lever, that can be wedged between the wheel rim and the tire bead. However, conventional pry bar and tire lever devices can cause damage to the tire or the wheel rim. This type of damage is particularly harmful to modern low-profile wheel rims and those wheel rims having a cosmetic surface such as polished, chrome, or anodized rims.

Modern wheel servicing machines such as tire changers often include a base having a rotatable wheel mount for securely holding a wheel rim during tire changing operations. Such machines typically also include a swing arm having a vertically, or longitudinally, adjustable tire changing tool head, or mount/demount head, extending downwardly from the swing arm via a shaft for assisting in tire mounting and demounting. The mount/demount head is generally positioned near the wheel rim during tire mounting and demounting operations. Conventional mount/demount heads include a bead lifter portion that protrudes from the mount/demount head in a first direction substantially tangential to the outer perimeter of a wheel rim to be serviced. During tire removal, a tire bead may be lifted over the bead lifter, and the wheel may be rotated on the rotatable mount to separate the bead upwardly away from the bead seating flange on the wheel rim. Conventional mount/demount heads also typically include a tongue tool, or blade, extending from the mount/demount head in a tangential direction opposite the bead lifter. The tongue tool may have a substantially flat or slightly curved surface oriented in a plane generally parallel to the plane of rotation of the wheel rim when mounted on the wheel mount. The tongue tool provides a bearing surface across which a tire bead slides as the tire is installed over the bead engagement flange on the outer perimeter of the wheel rim. In conventional mount/demount heads, the bead lifter and the tongue tool are typically both integrally formed on one solid mount/demount head body.

In some applications, it may be possible for the tongue tool portion of the mount/demount head to contact the wheel rim, either intentionally or inadvertently during tire installation or tire removal. Such contact can cause damage to the wheel rim, especially when the mount/dismount head is made of a hard material such as a metal. To prevent such damage, some conventional mount/demount heads are made entirely of a non-metal material such as a plastic or a polymer material. The non-metal material may contact the wheel rim without causing excessive damage to the wheel rim.

In practice, operators of tire changing machines frequently encounter situations where it may be necessary to change the mount/demount head from a metal model to a non-metal model. The changing procedure is cumbersome and time-consuming because it generally requires manual removal of the existing tool and manual attachment of the replacement tool. Additionally, in many situations, the non-metal tool may not provide enough rigidity for subsequent operations, and the operator may be required to remove the non-metal tool and re-attach the metal tool. In a tire shop where numerous wheels may be serviced, it may be necessary to change the mount/dismount head several times during the course of a day, resulting in machine down time, reduction in operating efficiency and machine throughput, and operator fatigue.

To overcome the problems associated with frequently changing mount/demount heads during tire changing machine operation, others have developed quick-release and quick-attachment couplings to allow faster interchange between metal and non-metal mount/dismount heads. For example, U.S. Pat. No. 5,941,294 discloses a rim holding tire changer with a mount/dismount head connect structure. Additionally, U.S. Pat. No. 5,752,555 teaches a rim clamp tire changer mounting head adjustment release mechanism. However, such conventional couplings do not eliminate the need to manually change tool heads, they merely make the change-out process more efficient.

Still others have attempted to solve this problem by providing non-metal wear pads that attach to the surfaces on conventional metal mount/dismount heads that face the wheel rim. The wear pads provide some protection against wheel damage. However, the pads may become worn or damaged, requiring replacement. Additionally, if such pads are not monitored and replaced when necessary, inadvertent wheel rim damage may occur.

Another problem associated with conventional mount/dismount heads is that they are generally shaped to accommodate a specific wheel diameter or range of wheel diameters. Thus, when a tire changing machine operator services a large diameter wheel followed by a small diameter wheel, or vice versa, it is often necessary to change the mount/dismount head to accommodate the different wheel rim size.

What is needed, then, are improvements in mount/dismount tool heads for use with tire changing machines.

BRIEF SUMMARY

The present invention provides a tire changing tool head, or a mount/demount head for a tire changing machine. The mount/demount head includes a head body and a tongue. The head body is configured for modular attachment to a shaft in some embodiments, and the head body may be integrally formed on the shaft in other embodiments. The tongue member is pivotally attached to the head body. The head body includes a bead lifter tool protruding from the head body in a first direction generally tangential to a wheel rim aligned near the mount/demount head. In some embodiments, the tongue member includes a tongue shoulder and a tongue blade extending from the tongue shoulder in a second direction generally opposite the first direction. The tongue member is pivotable about a pivot axis relative to the head body. In some embodiments, the pivot axis is oriented substantially parallel to the shaft. During use, the tongue may rotate freely in both angular directions relative to the head body.

A further embodiment of the present invention provides a tire changing tool head apparatus including a head body and a bead lifter tool extending from the head body in a first direction. A tongue member extends from the head body a second direction opposite the first direction. The tongue member is pivotally attached to the head body such that the tongue member is freely pivotable in both angular directions.

Yet another embodiment of the present invention provides a tire changing machine including a base, a rotatable wheel mount disposed on the base, a support tower extending from the base, a swing arm pivotally attached to the support tower, and a longitudinally adjustable shaft extending from the swing arm. The shaft includes a free end extending toward the wheel mount, and a tire changing tool head is disposed on the free end of the shaft. The tool head includes a head body, a bead lifter tool disposed on the head body, and a tongue member pivotally attached to the head body.

An object of the present invention is to provide a mount/demount head having a head body including a metal material configured for attachment to a shaft and a tongue member pivotally attached to the head body, wherein the tongue member includes a non-metal material on the portions of the tongue member that engage a wheel rim.

A further object of the present invention is to provide pivotable tongue member for allowing use with wheel rims of different sizes.

An additional object of the present invention is to provide a two-piece mount/demount head having a pivotable tongue member.

Yet another object of the present invention is to provide a pivotable tongue member that is integrally molded from a solid non-metal material such as a polymer.

A further object of the present invention is to provide a tool shaft with an integral mount/dismount head body and a tongue member pivotally attached to the head body.

Numerous other objects, advantages and features of the present invention will be readily apparent to those of skill in the art upon a review of the following drawings and description of a preferred embodiment.

DETAILED DESCRIPTION

Figure 1:
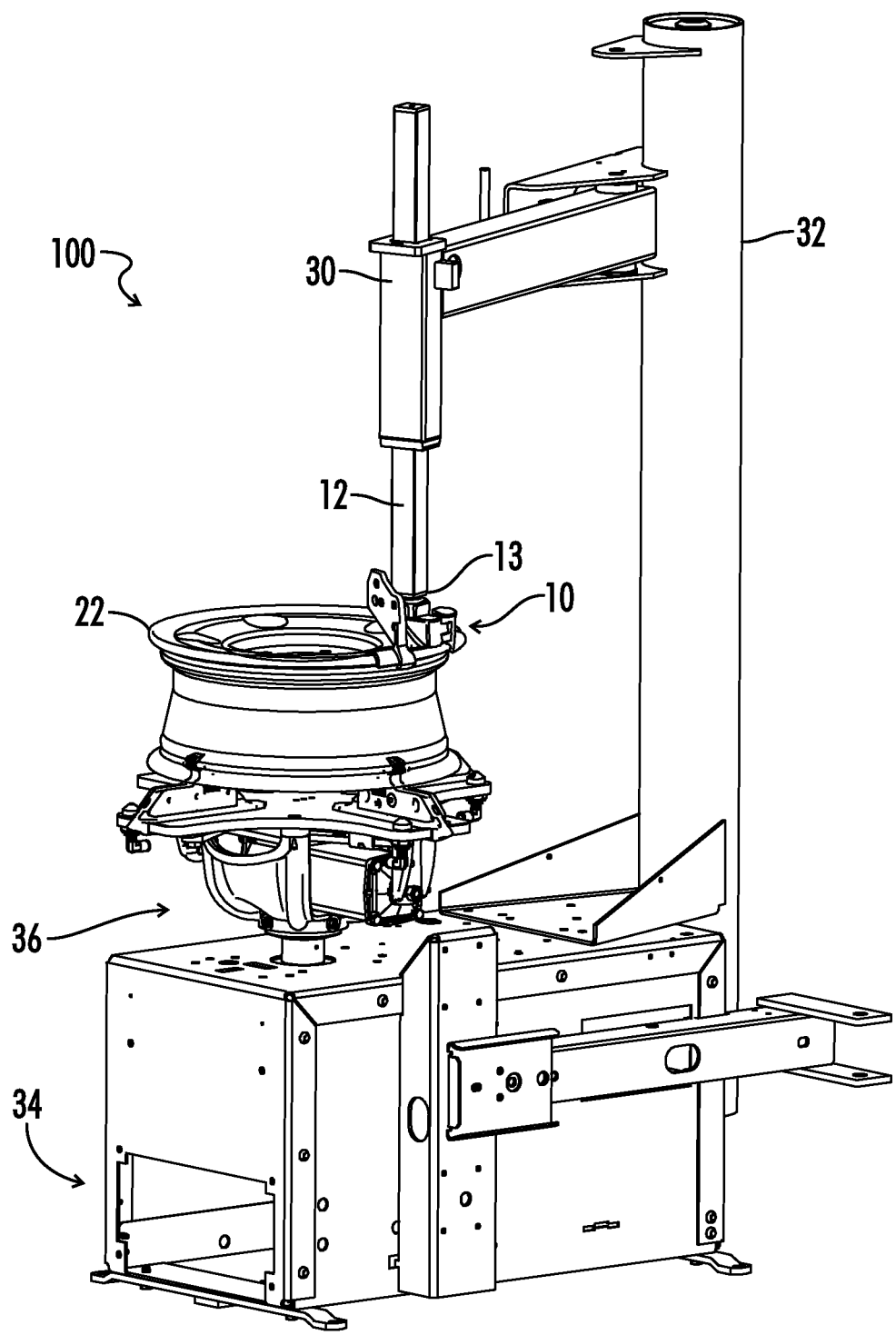
FIG. 1 is a perspective view of an embodiment of a tire changing machine including a mount/demount head in accordance with the present invention.

Referring now to the drawings, FIG. 1 illustrates a perspective view of an embodiment of a modern tire changing machine 100. The tire changing machine 100 includes a base 34 and a support tower 32 extending upwardly from the base. The support tower 32 may extend from a different location near the base in other embodiments not shown. A rotatable wheel mount 36, or wheel holding platform 36, is mounted on the base. The wheel holding platform 36 may include a rim clamp, center post clamp, or other wheel holding devices known in the art for securing a wheel rim to the base. A swing arm 30 is pivotally attached to the support tower 32. A tool holder shaft 12 extends from the swing arm 30 generally toward the wheel holding platform 36. The tool holder shaft 12 generally includes a free end 13 extending toward a wheel rim 22 when the wheel rim 22 is mounted on the wheel mount 36. The tire changing machine 100 can be oriented in a vertical or a horizontal position in various embodiments. A mount/demount head 10, or mount/dismount head, or tire changing tool head, in accordance with the present invention may be mounted to the free end 13 of the tool holder shaft 12 for engaging a tire during tire mounting or demounting operations.

Figure 2:
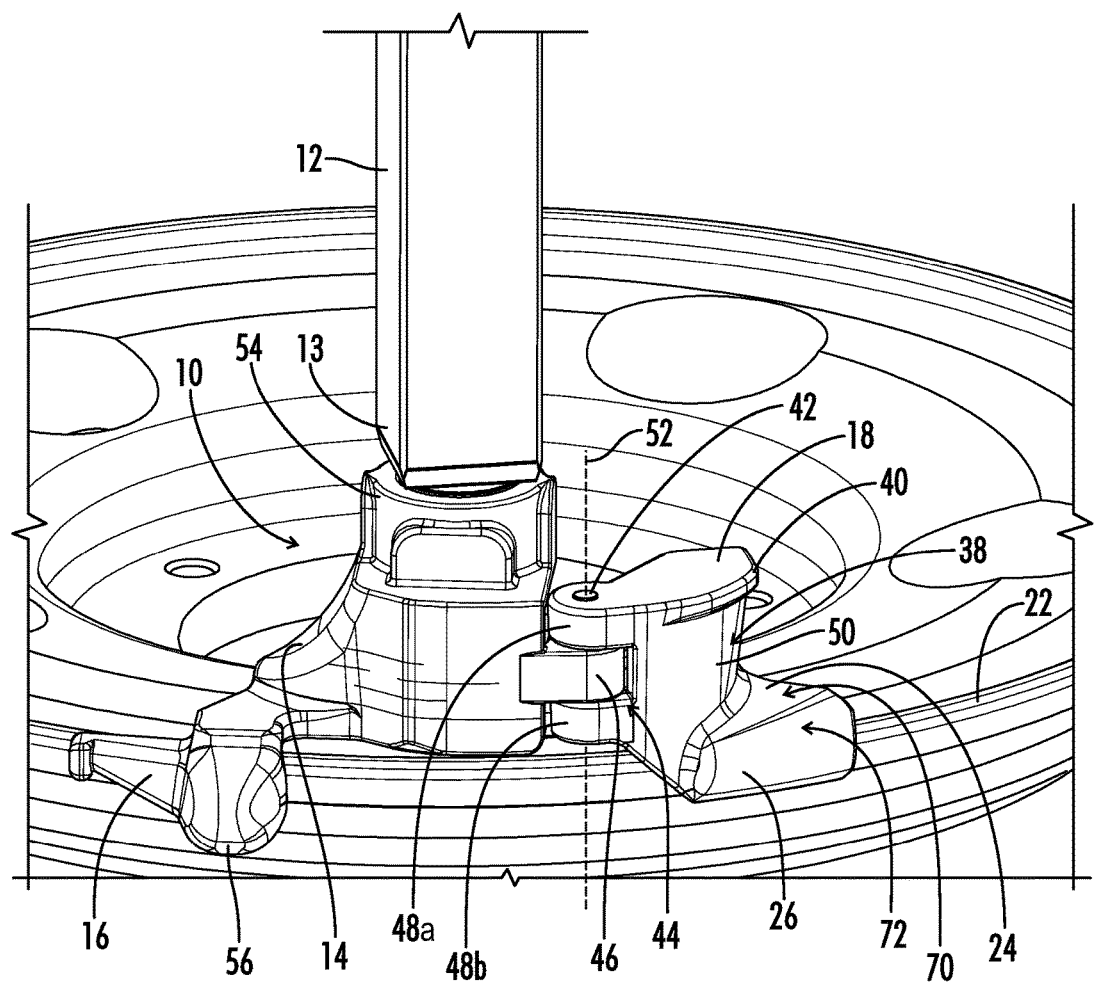
FIG. 2 is an outer perspective view of an embodiment of a mount/demount head in accordance with the present invention.
Figure 3:
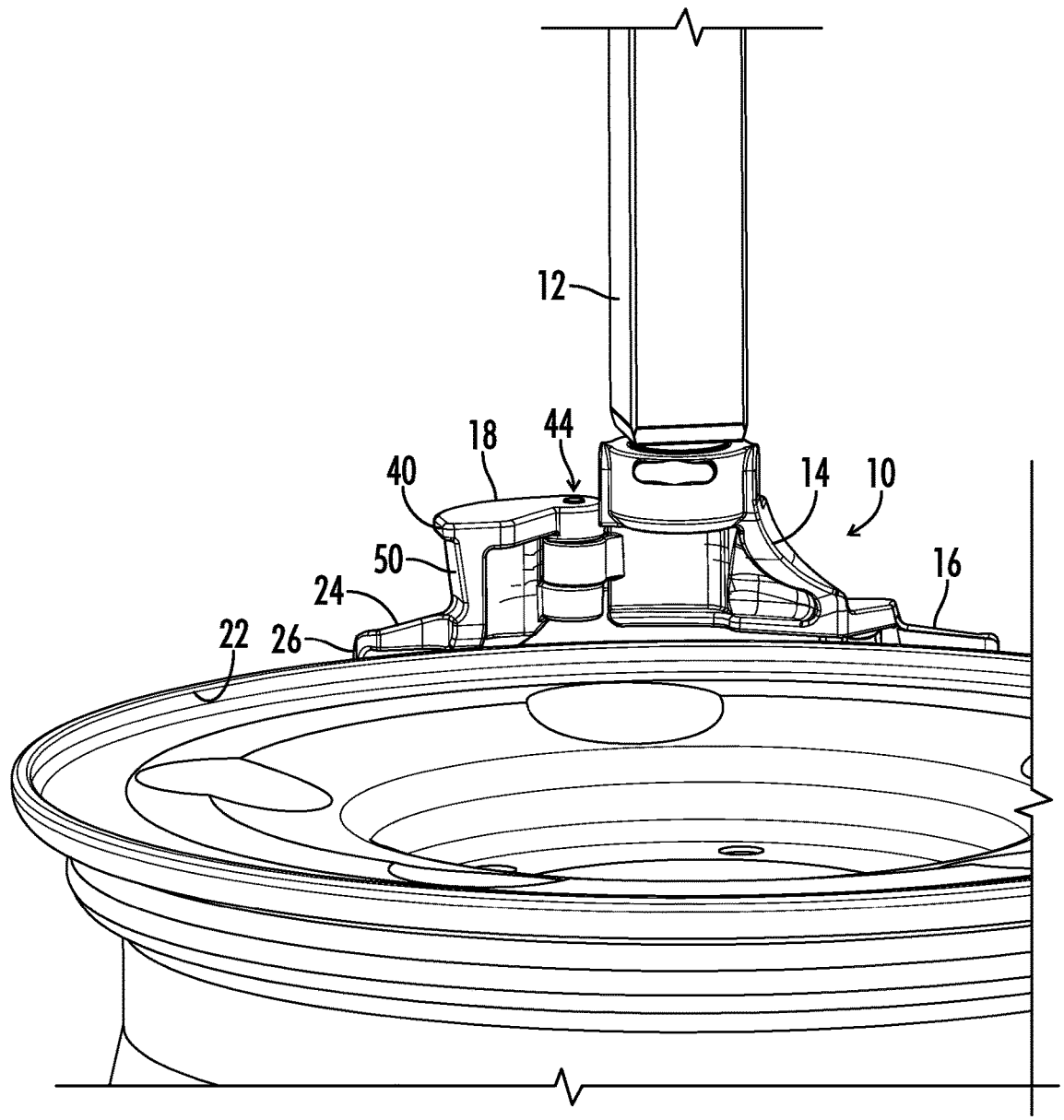
FIG. 3 is an inner perspective view of an embodiment of a mount/demount head in accordance with the present invention.

Referring to FIG. 2, a first embodiment of a mount/demount head 10 in accordance with the present invention is illustrated. Mount/demount head 10 includes two primary components—a head body 14 and a tongue member 18. Head body 14 is configured to be attached to the swing arm 30 or shaft 12. In some embodiments, head body 14 is detachably securable directly to shaft 12 via a shaft coupling 54 on head body 14. The shaft coupling 54 may include a socket defined in head body 14 in some embodiments. In other embodiments, shaft coupling 54 includes a mounting boss extending upwardly from head body 14 for engagement with a corresponding socket on shaft 12. In further embodiments, shaft coupling 54 may be permanently attached to shaft 12 such that shaft 12 and head body 14 are fixed. Shaft coupling 54 may include a conventional threaded coupling or a quick-release coupling known in the art.

Figure 4A:
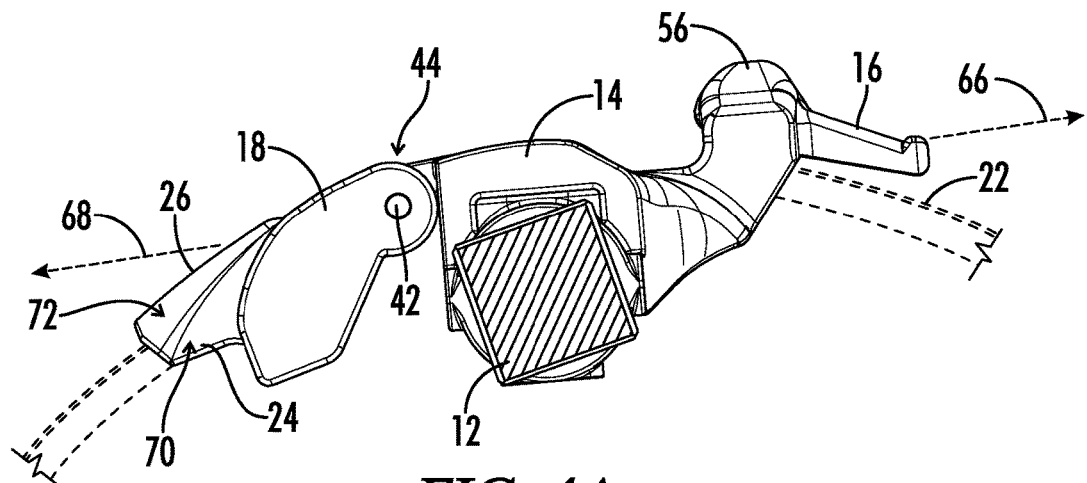
FIG. 4A is a plan view of an embodiment of a mount/demount head including a pivotable tongue tool positioned at a first angular position to accommodate a wheel rim having a first radius.

Head body 14 also includes a bead lifter tool 16 projecting from the head body in a first direction 66, as seen in FIG. 4A. First direction 66 is generally oriented in the direction of a reference axis aligned tangentially to a wheel rim positioned adjacent to the mount/demount head 10 for wheel servicing operations. Bead lifter tool 16 does not have to be perfectly aligned with the reference axis, and may be slightly angularly offset for providing optimal bead lifting performance and still extend in the first direction 66.

Bead lifter tool 16 includes a bead lifter shoulder 56 projecting away from wheel rim 22. Bead lifter shoulder 56 provides a bearing surface for applying a local downward force against a tire bead during tire installation or tire removal. Bead lifter tool 16 projects from head body 14 adjacent bead lifter shoulder 56 in some embodiments.

Bead lifter tool 16 may be formed of a rigid material such as a metal. In some embodiments, bead lifter tool 16 is formed of a steel or aluminum metal material. In various other embodiments in accordance with the present disclosure, bead lifter tool 16 may include a non-metal material such as a polymer or a plastic material.

Bead lifter tool 16 may be integrally formed with head body 14 in a one-piece construction, such as a casting or a forging. In additional embodiments, bead lifter tool 16 may be a modular component that is detachably securable to head body 14.

Referring further to FIGS. 2, 3, 4A, and 4B, in some embodiments, tongue member 18 extends from the head body 14 in a second tangential direction 68 generally opposite the first tangential direction 66. As noted with the bead lifter tool, the tongue member 18 may be found to extend in the second tangential direction 68 even where the tongue member 18 does not align perfectly with a reference tangent axis, as long as the tongue member 18 extends generally in the second tangential direction 68.

Tongue member 18 is pivotally attached directly to head body 14 at a pivotable tongue joint 44. Pivotable tongue joint 44 may be formed in various configurations known in the art for providing a pivoting connection. In some embodiments, tongue member 18 is pivotally attached to head body 14 by a head boss 46 (FIG. 2) protruding from head body 14 generally in the second tangential direction 68. One or more tongue bosses 48a, 48b also extend from tongue member 18 generally toward head body 14. Each tongue boss 48a, 48b can be positioned above or below head boss 46. A tongue pivot pin 42 extends through head boss 46 and tongue bosses 48a, 48b. Tongue pivot pin 42 and pivotable tongue joint 44 define a tongue pivot axis 52 oriented substantially parallel to the tool holder shaft 12 in some embodiments. In some embodiments, tongue pivot axis 52 may be substantially vertical. In additional embodiments, tongue pivot axis 52 is oriented substantially normal to the plane of rotation of wheel 22 when mounted on wheel mount 36. Tongue pivot axis 52 may be slightly offset from parallel with tool holder shaft 12 in additional embodiments.

Figure 4B:
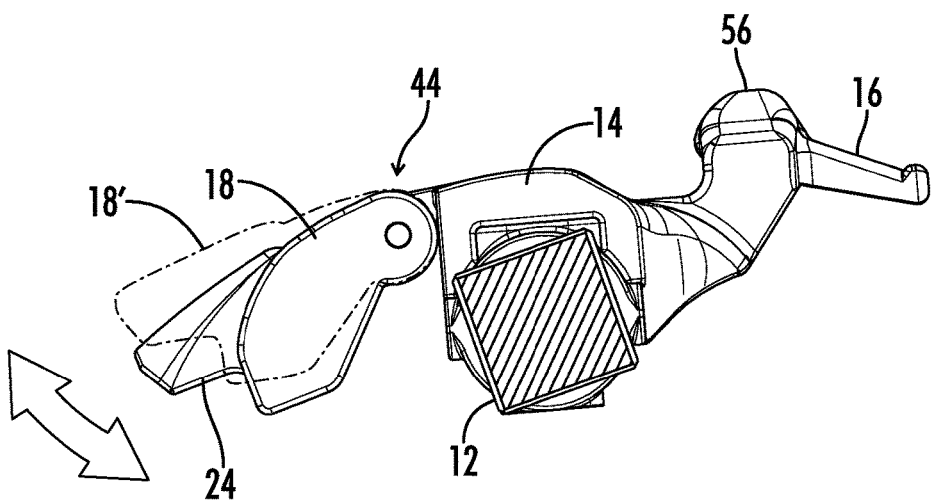
FIG. 4B is a plan view of an embodiment of the mount/demount head of FIG. 4A including a pivotable tongue tool positioned at a second angular position to accommodate a wheel rim having a second radius less than the first radius.

During use, head body 14 may be fixed, or locked, at an angular position relative to tool holder shaft 12, as seen in FIG. 4B, yet tongue member 18 is freely pivotable relative to head body 14 in both angular directions about pivot axis 52. For example, in some applications, tongue member 18 may move from a first angular position 18' relative to wheel rim to a second angular position closer to or farther from wheel rim 22. Movement of tongue member 18 relative to wheel rim 22 allows wheels of different diameters to be serviced interchangeably with mount/demount head 10. Tongue member 18 can pivot inwardly toward a wheel rim location to accommodate a smaller wheel size, and tongue member 18 can pivot outwardly away from a wheel rim location to accommodate a larger wheel size.

Tongue member 18 in some embodiments includes an integrally formed component having a one-piece construction. Tongue member 18 may be formed of a non-metal material in some embodiments, such as a polymer. Tongue member 18 may be formed of nylon in some embodiments. Additionally, tongue member 18 may include only nylon and is unitarily formed in a one-piece construction, such as a molded component, in some embodiments.

Tongue member 18 includes a tongue shoulder 50 (FIG. 3) having a substantially upright orientation facing away from the head body 14. The upright orientation of tongue shoulder 50 may be described as being oriented substantially normal to the plane of rotation of the wheel in some embodiments. Tongue shoulder 50 defines a shoulder bearing surface against which a tire bead may slide during installation of a tire onto a wheel rim. The shoulder bearing surface of tongue shoulder 50 may have a curved profile facing generally away from head body 14, curving away from a wheel rim location, and changing orientation from a substantially radial upright plane toward a substantially tangential upright plane.

An upper tongue flange 40 projects outwardly from tongue shoulder 50 in some embodiments. Upper tongue flange 40 provides an upper barrier to prevent a tire bead from sliding off the shoulder bearing surface of tongue shoulder 50 during tire installation.

A tongue blade 24 projects from tongue member 18, and more particularly from the lower portion of tongue shoulder 50, generally in the second tangential direction 68. Tongue blade 24 includes an upper tongue blade surface defining a first blade surface region 70 oriented approximately parallel to the plane of rotation of the wheel. First blade surface region 70 does not have to be completely parallel to the plane of rotation of the wheel to function, but instead may include a slight angular offset relative to the plane of orientation of the wheel. A second blade surface region 72 on upper tongue blade surface slopes downwardly and radially outwardly away from the first blade surface region 70. As such, tongue blade 24 has a sloped profile that extends from above a wheel rim, as seen in FIG. 2 and around the outer edge of the wheel rim.

A tongue rim shield 26 is located adjacent to tongue blade 24. Tongue rim shield 26 includes a projection that covers the outer edge of the wheel rim 22. During tire installation, a tire bead slides over tongue blade 24 and may additionally press against tongue shoulder 50. The radial force exerted inwardly toward the wheel rim 22 by the tire bead may cause the pivotable tongue member 18 to be pushed radially inwardly toward the wheel rim 22. Tongue rim shield 26 can engage the wheel rim 22 to prevent the tongue member 18 from pivoting too far inwardly toward the wheel rim. Because tongue member 18, including tongue rim shield 26, may be formed of a non-metal material such as nylon in some embodiments, the direct contact between tongue rim shield 26 and the wheel rim 22 does not result in damage to the wheel rim. Additionally, tongue rim shield 26 can include a cupped interior surface shaped to correspond to the curvature of the wheel rim.

As seen in FIG. 2, in some embodiments, a tongue guide recess 38 may be defined between upper tongue flange 40 and tongue blade 24. Tongue guide recess 38 provides a channel for passage of a tire bead as the tire bead slides over the tongue member and onto the wheel rim 22.

Figure 5:
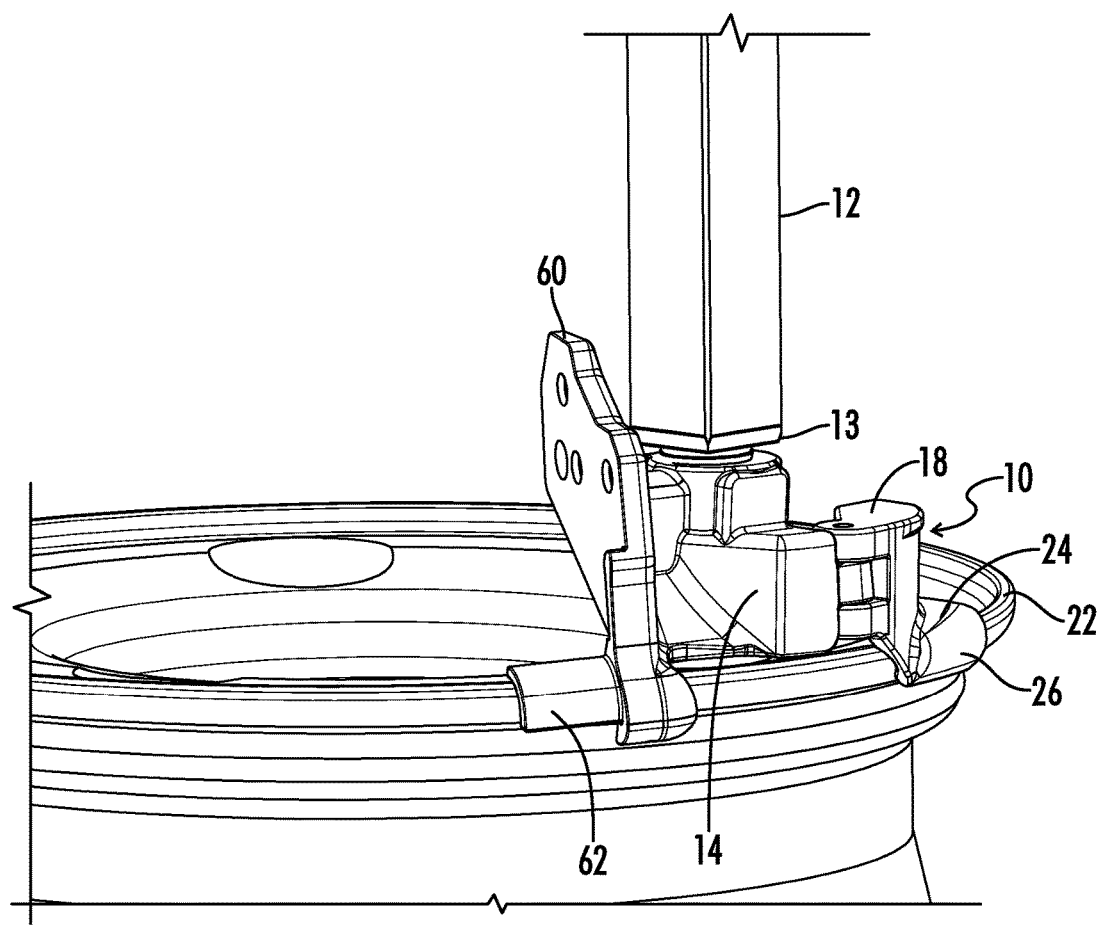
FIG. 5 is an outer perspective view of an embodiment of a mount/demount head including a mounting plate for mounting a bead lifter in accordance with the present invention.

Referring now to FIG. 5, in some embodiments, head body 14 includes a mounting member 60 disposed thereon. Mounting member 60 is provided such that a modular bead lifting device may be attached to mount/demount head 10, and particularly to head body 14. In some applications, the bead lifter device 16 seen in FIG. 2 may not be best-suited for wheel servicing operations. Instead, a user may desire to implement a mechanical bead lifter device. Conventional mechanical bead lifter devices are known in the art for attachment to tire changing tool heads such as mount/demount head 10. By providing a mounting member 60 on head body 14, a modular mechanical bead lifter device can be installed on mount/demount head 10. In this alternative embodiment, illustrated in FIGS. 5-7, mount/demount head 10 includes a tongue member 18 pivotally attached to head body 14.

Figure 6:
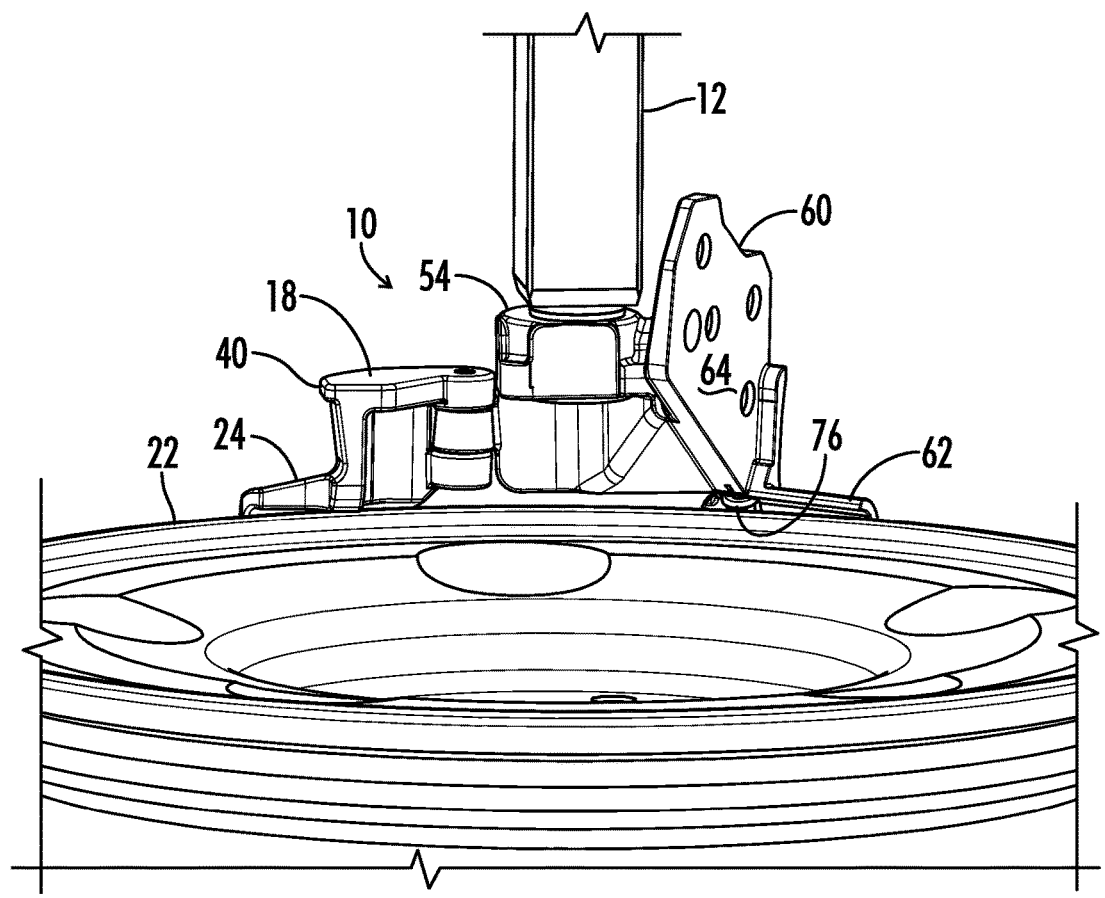
FIG. 6 is an inner perspective view of the embodiment of a mount/demount head of FIG. 5 including a mounting plate for mounting a bead lifter in accordance with the present invention.
Figure 7:
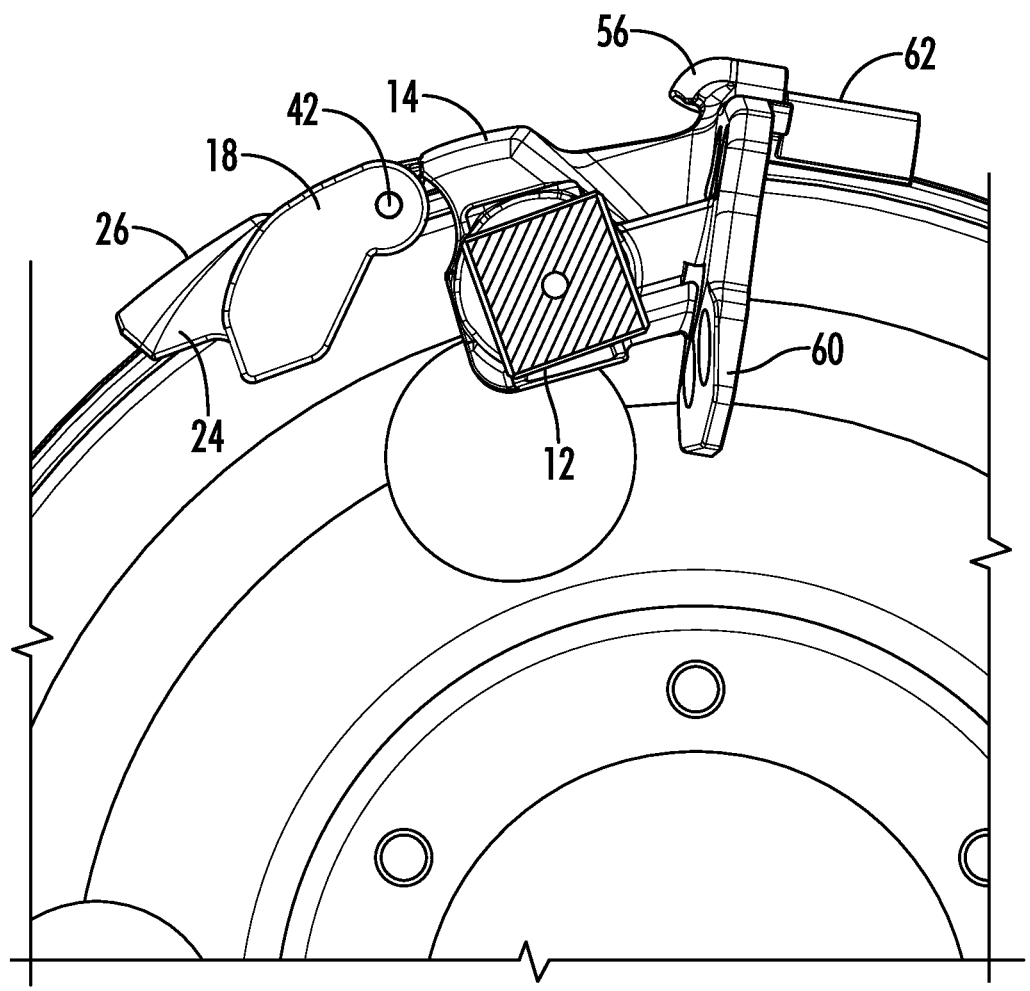
FIG. 7 is an overhead plan view of the embodiment of a mount/demount head of FIG. 5 including a mounting plate for mounting a bead lifter in accordance with the present invention.

In some embodiments, mounting member 60 includes a mounting plate having a substantially flat mounting surface 64 facing away from head body 14, as seen in FIG. 6. In some embodiments, mounting surface 64 is oriented normal to a reference axis aligned with a tangent of wheel rim 22, as seen in FIG. 7. Mounting surface 64 is configured to receive and support a portion of a modular mechanical bead lifter attachment.

In various other embodiments, mounting member 60 includes one or more attachment locations for securing a modular mechanical bead lifter to head body 14, but may not necessarily require a mounting plate. A plurality of fastener holes may be defined through mounting member 60 for attachment of a bead lifting device.

Additionally, a mount shield 62 extends from mounting member 60 in some embodiments. Mount shield 62 provides a concave region shaped to correspond to the curvature of wheel rim 22 in some embodiments. Mount shield 62 is generally disposed in the same plane as tongue rim shield 26 in some embodiments. A rim roller wheel 76 is rotatably disposed in the concave region on the side of mount shield 62 facing toward wheel rim 22 in some embodiments, as seen in FIG. 6. Rim roller wheel 76 may rollingly engage the wheel rim 22 during wheel servicing operations to prevent rim damage in some embodiments.

Thus, although there have been described particular embodiments of the present invention of a new and useful Two-Piece Mount/Demount Head for a Wheel Service Machine it is not intended that such references be construed as limitations upon the scope of this invention except as set forth in the following claims.

What is claimed is:

1. A mount/demount head apparatus usable on a tool holder shaft extending from a swing arm on a tire changing machine for performing tire changing operations on a wheel rotatably mounted on the machine, the apparatus comprising:
    a head body;
    a bead lifter tool projecting from the head body in a first direction;
    a tongue member extending from the head body in a second direction generally opposite the first direction, wherein the tongue member is freely pivotable relative to the head body at a pivotable tongue joint during the tire changing operations about a tongue pivot axis offset from the tool holder shaft, the tongue member including:
        a tongue shoulder disposed on the tongue member facing away from the head body, a face of the tongue shoulder having an orientation that is substantially parallel with the tongue pivot axis;
        a tongue blade extending from the tongue shoulder, the tongue blade including an upper tongue blade surface having a first blade surface region oriented approximately perpendicular to the tongue pivot axis and a second blade surface region sloping downwardly and radially outwardly away from the first blade surface region;
        a tongue flange extending from the tongue shoulder above the tongue blade; and
        a tongue guide recess defined in the tongue shoulder between the tongue flange and the tongue blade;
    a coupling disposed on the head body;
    a socket defined in one of either the coupling or the tool holder shaft; and
    wherein:
        the coupling is configured to secure the head body to the tool holder shaft at the socket; and
        the head body is angularly adjustable relative to the tool holder shaft when secured to the tool holder shaft.

2. The apparatus of claim 1, wherein:
the tongue joint defines the tongue pivot axis about which the tongue member is pivotable, and
the tongue pivot axis is oriented substantially parallel to the tool holder shaft.

3. The apparatus of claim 1, wherein:
the head body comprises a metal material; and
the tongue member comprises a non-metal material.

4. The apparatus of claim 1, wherein:
the tongue member comprises a polymer material.

5. The apparatus of claim 1, wherein:
the tongue member comprises nylon.

6. The apparatus of claim 1, wherein:
the tongue member consists entirely of nylon.

7. The apparatus of claim 1, the pivotable tongue joint further comprising:
    a head boss extending from the head body toward the tongue member;
    a tongue boss extending from the tongue member toward the head body;
    a pivot pin disposed between the head boss and the tongue boss; and
    wherein the pivot pin pivotally attaches the tongue member to the head body.

8. The apparatus of claim 1, wherein:
the bead lifter tool is integrally formed on the head body.

9. The apparatus of claim 1, further comprising:
a mounting member disposed on the head body on the side opposite the tongue member.

10. The apparatus of claim 9, wherein:
the bead lifter tool comprises a separate component attached to the mounting member.

* * * * *